United States Patent Office 3,231,085
Patented Jan. 25, 1966

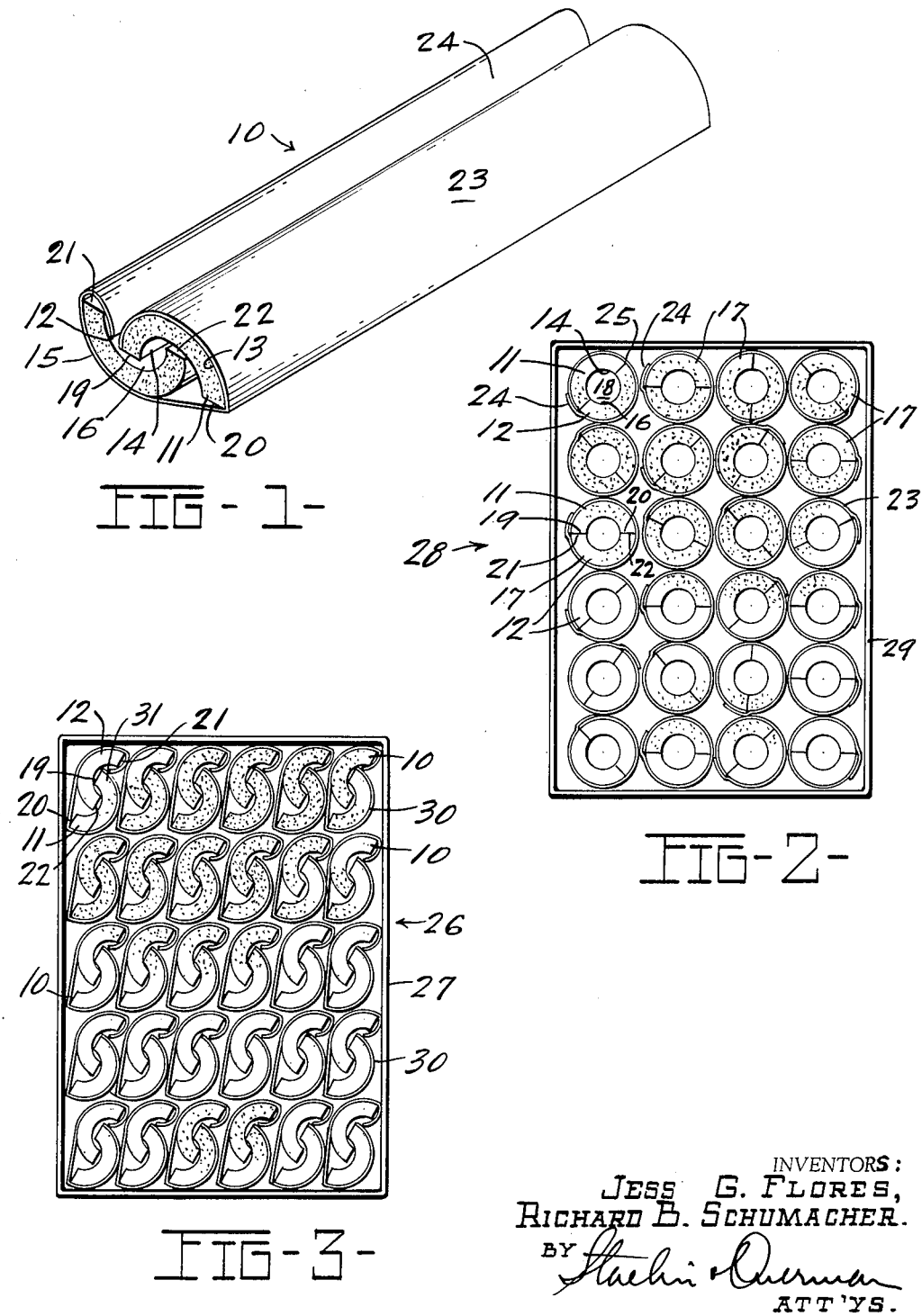

3,231,085
INSULATION ASSEMBLY AND PACKAGE
Jess G. Flores, San Jose, and Richard B. Schumacher, San Mateo, Calif., assignors to Owens-Corning Fiberglas Corporation, a corporation of Delaware
Filed Mar. 13, 1964, Ser. No. 351,682
7 Claims. (Cl. 206—65)

This invention relates to an insulation assembly, and more particularly, to a conduit insulating unit which can be readily packaged.

Sectional type pipe insulation used for jacketing either hot or cold conduits comprises, for example, a fibrous glass wool body which in turn is covered with one of many types of jacketing material.

A flexible sheet material such as canvas, when used as a cover, is readily adaptable for use on insulation bodies to be applied to heated conduits because it is easily applied and also can be readily painted after it is secured to the conduit. A flame retardant jacket constructed of special kraft paper combined with an aluminum foil laminate is used for special applications. A waterproof cover or jacket consisting of, for example, waterproof felt is also available for applications where waterproof characteristics are desirable or necessary.

If the conduit to be encased or insulated has a circular cross section, the insulation body normally is in the shape of a right cylinder which has been longitudinally split in half forming two longitudinally extending symmetrical bodies. The desired jacket is then adhered to the outer surface of the two insulating sections in such a manner that the jacket forms a hinge at one of the longitudinal joints and the second longitudinal joint is left open so that the insulation unit can be applied in the field to the conduit to be insulated.

Efficient packaging of jacketed conduit insulation is a major problem to a manufacturer. This can best be illustrated by the use of an example. Fibrous glass wool having a density of approximately 7.25 pounds per cubic foot, may, for example, form the body of the insulation unit. Assuming that the conduit to be insulated has a 6″ outside diameter; the insulating sections are constructed in standard 36″ lengths; and the insulating unit has a 1″ thickness of insulating material, this particular insulating unit weighs a total of 3.2 pounds. However, it occupies a space in excess of one cubic foot. The expenses incurred by the insulation manufacturer in storing his finished product, in shipping the insulation units, and by a customer in providing inventory space for the completed product amount to a significant percentage of the ultimate cost of one of these insulation units. Another expense which must be considered is the handling of boxes containing the finished insulation units. The labor expenses, incurred by such handling, are significant because packing boxes are quite large and bulky relative to the total weight of the box.

It is the primary object of the instant invention to provide a novel insulation assembly which can be packaged efficiently.

It is another object of the instant invention to provide a novel package which contains a plurality of insulation assemblies constructed according to the instant invention.

It is still another object of the instant invention to provide an insulation assembly which is readily adaptable to a conduit which is to be insulated.

Further objects of this invention will become apparent from the following specification and drawings in which:

FIG. 1 is a front quarter view in perspective of an insulation assembly according to the instant invention;

FIG. 2 is a top view of a shipping box, with the cover removed, containing jacketed insulation assemblies packaged in a prior art manner; and FIG. 3 is a top view of a novel package drawn on the same scale as FIG. 2, containing a plurality of insulation assemblies according to the instant invention.

Briefly, the invention relates to an insulation assembly and a novel insulation assembly package. The insulation assembly comprises first and second insulating sections alignable to form a conduit insulating unit which has an exterior surface and an opposed interior surface defining a conduit engaging recess. Each of the insulating sections constitutes a longitudinally extending part of the unit, and each section has first and second matching surfaces which abut, respectively, when the sections are aligned to form a conduit unit. A continuous, flexible, sheet material, which constitutes an exterior cover for the conduit unit when the sections are aligned, extends from a point adjacent the first matching surface of the first section around the first section, and around the second section to the first connecting surface of the second section. Means are provided to adhere the sheet material to the total outer surface of the first section and to a predetermined portion of the outer surface of the second section, adjacent the first matching surface thereof. The first matching surface of the first section is positioned between the first and second matching surfaces of the second section in such a position that the first matching surface of the first section is closely adjacent the interior surface of the second section.

Referring to FIG. 1, an insulation assembly embodying the instant invention is generally indicated by the reference numeral 10. The insulation assembly 10 comprises a first insulating section 11 and a second insulating section 12. The insulation assembly 10 is shown in FIG. 1 as having a circular cross section, however, an insulation assembly having a rectangular cross section or other cross sectional configuration is also within the scope of the instant invention. The insulating sections 11 and 12 are composed of known insulating materials, for example, fibrous glass wool.

The first insulating section 11 has an exterior surface 13 and an opposed interior surface 14. Likewise, the second insulating section 12 has an exterior surface 15 and an opposed interior surface 16. Referring to FIG. 2, the first insulating section 11 and the second insulating section 12 are alignable to form a conduit insulating unit 17 with the interior surfaces 14 and 16 defining a conduit engaging recess 18.

The first insulating section 11 has a first matching surface 19 and a second matching surface 20 and likewise, the second insulating section 12 has a first matching surface 21 and a second matching surface 22. Referring to FIG. 2, when the first insulating section 11 is aligned with the second insulating section 12 to form the conduit insulating unit 17, the first matching surfaces 19 and 21 and the second matching surfaces 20 and 22 abut, respectively.

A cover 23 comprising a continuous flexible sheet material, for example, canvas, is adhered to selected portions of the outer surfaces 13 and 15 of the sections 11 and 12. The cover 23 extends from a point adjacent the first matching surface 19 of the first section 11, around the first section 11 and around the second section 12 to the first matching surface 21 of the second section 12. In the preferred embodiment, the cover 23 extends beyond the first matching surface 21 of the second section 12 to form a longitudinally extending flap 24. The cover 23 is adhered to the insulating sections 11 and 12 by glue, or other types of suitable adhesives.

The cover 23 is adhered to a predetermined portion of the exterior surface 15 of the second insulating section 12. This predetermined portion extends from a point adjacent the first matching surface 21 of the second insulating section 12 to a point approximately at the midpoint of the exterior surface 15. A portion of the cover 23 acts as a hinge 25 (FIG. 2) when the section 11 and the section 12 are aligned to form the conduit insulating unit 17.

When the sections 11 and 12 are in the relative positions shown in FIG. 1, the first matching surface 19 of the first insulating section 11 is positioned between the first matching surface 21 and the second surface 22 of the second insulating section 12 and is closely adjacent the interior surface 16 of the second insulating section 12. The position of the first matching surface 19 of the first insulating section 11 with respect to the interior surface 16 is determined by the length of the unadhered portion of the cover 23. The unadhered portion is stretched taut thereby limiting the horizontal translation of the sections 11 and 12 with respect to each other.

Referring to FIG. 3, a package embodying the instant invention is generally indicated by the reference number 26. The package 26 comprises a box 27 containing a plurality of insulating assemblies 10.

Referring to FIG. 2, a package 28, comprising a box 29 and a plurality of conduit insulating units 17 positioned therein represents a prior art package.

The boxes 26 and 27 have identical dimensions. When the insulating sections 11 and 12 of one of the insulating assemblies 10, shown in FIG. 3, are translated with respect to each other, they form the insulating unit 17, shown in FIG. 2. The package 28 contains twenty-four conduit insulating units 17, while the package 26 contains thirty insulation assemblies 10. This graphically illustrates a 25% increase in the number of insulation units which can be packed by using the package 26 as compared with the prior art package 28.

Referring to FIGURE 3, the insulation assemblies 10 are disposed within the box 27 in a side-by-side relationship forming a plurality of predetermined rows 30.

In the embodiment shown in FIG. 3 the insulation sections 11 and 12 and have semi-circular horizontal cross-sections. The flap 24 extends around the first matching surface 21 of the second insulating section 12 and a free end 31 of the flap 24 extends downwardly into the pipe engaging recess 18 between the first matching surface 21 and the second surface 22 of the second insulating section 12. The flap 24, therefore, protects the corners of the first matching surface 21 from damage. This is a very important feature of the package 26.

The cover 23 extends across the second matching surface 20 of the first insulating section 11. The unadhered portion of the canvas or other cover 23 acts as a cushioning means to adsorb shock forces and thus protect the corners of the second matching surface 20.

The first matching surface 19 of the first insulating section 11 is disposed between the first matching surface 21 and the second matching surface 22 of the second insulating section 12. In a like manner the second matching surface 22 of the second insulating section 12 is disposed between the first matching surface 19 and the second matching surface 20 of the first insulating section 11.

Therefore, the package 26 is a structure in which all the corners of the respective matching surfaces are protected.

While the present invention has been disclosed in connection with a specific arrangement and disposition of the parts, it should be expressly understood that numerous modifications and changes may be made without departing from the scope of the appended claims.

What we claim is:

1. An insulation assembly comprising, in combination, first and second insulating sections alignable to form a conduit insulating unit having an exterior surface and an opposed interior surface which defines a conduit engaging recess, each of said sections constituting a longitudinally extending part of the insulating unit, and each having first and second matching surfaces which abut, respectively, when said sections are aligned to form a conduit unit, a continuous flexible sheet material which constitutes an exterior cover for the conduit unit when said sections are aligned, extending from adjacent the first matching surface of said first section, around said first section, and around said second section to the first matching surface of said second section, means adhering said sheet material to the total outer surface of said first section, and means adhering said sheet material to a predetermined portion of the outer surface of said second section adjacent the first matching surface thereof, and having the first matching surface of said first section positioned between the first and second matching surfaces of said second section closely adjacent the interior surface thereof.

2. A package comprising, in combination, a box having a rectangular cross section, a plurality of insulation assemblies positioned within said box, each of said insulation assemblies comprising, in combination, first and second insulating sections alignable to form a conduit insulating unit having an exterior surface and an opposed interior surface which defines a conduit engaging recess, each of said sections constituting a longitudinally extending part of the insulating unit, and each having first and second matching surfaces which abut, respectively, when said sections are aligned to form a conduit unit, a continuous flexible sheet material which constitutes an exterior cover for the conduit unit when said sections are aligned, extending from adjacent the first matching surface of said first section, around said first section, and around said second section to the first matching surface of said second section, means adhering said sheet material to the total outer surface of said first section, and means adhering said sheet material to a predetermined portion of the outer surface of said second section adjacent the first matching surface thereof, and having the first matching surface of said first section positioned between the first and second matching surfaces of said second section closely adjacent the interior surface thereof.

3. An insulation assembly comprising, in combination, first and second semi-cylindrical insulating sections alignable to form a circular conduit insulating unit having an exterior surface and an opposed interior surface which defines a conduit engaging recess, each of said sections constituting a longitudinally extending part of the insulating unit, and each having first and second matching surfaces which abut, respectively, when said sections are aligned to form a conduit unit, a continuous flexible sheet material which constitutes an exterior cover for the conduit unit when said sections are aligned, extending from adjacent the first matching surface of said first section, around said first section, and around said second section to the first matching surface of said second section, means adhering said sheet material to the total outer surface of said first section, means adhering said sheet material to a predetermined portion of the outer surface of said second section adjacent the first matching surface thereof, a flap adjacent said first matching surface of said second insulating section and having the first matching surface of said first section positioned between the first and second matching surfaces of said second section adjacent the interior surface thereof.

4. An insulation assembly according to claim 3, said cover being composed of a canvas material and a free end of said flap extending in protective relationship across said first matching surface of said second insulating section.

5. A package comprising, in combination, a box having a rectangular cross section, a plurality of insulation assemblies positioned within said box aligned in a side-by-side relationship forming a plurality of predetermined rows each of said insulation assemblies comprising, in combination, first and second insulating semi-cylindrical sections alignable to form a circular conduit insulating unit having an exterior surface and an opposed interior surface which defines a conduit engaging recess, each of said sections constituting a longitudinally extending part of the insulating unit, and each having first and second matching surface which abut, respectively, when said sections are aligned to form a conduit unit, a continuous flexible sheet material which constitutes an exterior cover for the conduit unit when said sections are aligned, extending from adjacent the first matching surface of said first section, around said first section, and around said second section to the first matching surface of said second section, means adhering said sheet material to the total outer surface of said first section, means adhering said sheet material to a predetermined portion of the outer surface of said second section adjacent the first matching surface thereof, a flap adjacent said first matching surface of said second insulating section, and having the first matching surface of said first section positioned between the first and second matching surfaces of said second section closely adjacent the interior surface thereof.

6. A package comprising, in combination, a box having a rectangular cross section, a plurality of insulation assemblies positioned within said box aligned in a side-by-side relationship forming a plurality of predetermined rows each of said insulation assemblies comprising, in combination, first and second insulating semi-cylindrical sections alignable to form a circular conduit insulating unit having an exterior surface and an opposed interior surface which defines a conduit engaging recess, each of said sections constituting a longitudinally extending part of the insulating unit, and each having first and second matching surfaces which abut, respectively, when said sections are aligned to form a conduit unit, a continuous flexible sheet material which constitutes an exterior cover for the conduit unit when said sections are aligned, extending from adjacent the first matching surface of said first section, around said first section, and around said second section to the first matching surface of said second section, means adhering said sheet material to the total outer surface of said first section, means adhering said sheet material to a predetermined portion of the outer surface of said second section adjacent the first matching surface thereof, a flap adjacent said first matching surface of said second insulating section, cushioning means adjacent said second matching surface of said first insulating section, and having the first matching surface of said first section positioned between the first and second matching surfaces of said second section and contacting the interior surface thereof.

7. A package, according to claim 6, said cover being composed of a canvas material and a free end of said flap extending in protective relationship across said first matching surface of said second insulating section.

References Cited by the Examiner
UNITED STATES PATENTS

| | | | |
|---|---|---|---|
| 231,832 | 8/1880 | Merriam | 138—152 |
| 589,903 | 9/1897 | Lysle | 138—158 |

THERON E. CONDON, *Primary Examiner.*